(12) United States Patent
Ragunathan

(10) Patent No.: US 12,441,905 B2
(45) Date of Patent: Oct. 14, 2025

(54) COATINGS WITH IMPROVED ADHESION

(71) Applicant: BASF SE, Ludwigshafen am Rhein (DE)

(72) Inventor: Kaliappa Ragunathan, Charlotte, NC (US)

(73) Assignee: BASF SE, Ludwigshafen Am Rhein (DE)

( * ) Notice: Subject to any disclaimer, the term of this patent is extended or adjusted under 35 U.S.C. 154(b) by 618 days.

(21) Appl. No.: 17/761,603

(22) PCT Filed: Sep. 16, 2020

(86) PCT No.: PCT/US2020/051122
§ 371 (c)(1),
(2) Date: Mar. 18, 2022

(87) PCT Pub. No.: WO2021/055512
PCT Pub. Date: Mar. 25, 2021

(65) Prior Publication Data
US 2022/0363938 A1    Nov. 17, 2022

Related U.S. Application Data

(60) Provisional application No. 62/903,342, filed on Sep. 20, 2019.

(51) Int. Cl.
*C09D 133/00* (2006.01)
*C09D 125/08* (2006.01)
*C09D 133/08* (2006.01)
*C09D 133/10* (2006.01)

(52) U.S. Cl.
CPC ......... *C09D 133/08* (2013.01); *C09D 125/08* (2013.01); *C09D 133/10* (2013.01)

(58) Field of Classification Search
None
See application file for complete search history.

(56) References Cited

U.S. PATENT DOCUMENTS

| | | | |
|---|---|---|---|
| 4,504,635 A | 3/1985 | Weber et al. | |
| 5,276,096 A | 1/1994 | Serdiuk et al. | |
| 6,262,144 B1 | 7/2001 | Zhao et al. | |
| 6,426,381 B1 | 7/2002 | Konig et al. | |
| 6,841,655 B1 | 1/2005 | Gota et al. | |
| 2002/0175983 A1 | 11/2002 | Ishikawa et al. | |
| 2007/0100074 A1* | 5/2007 | Devonport | C09D 133/08 525/107 |
| 2008/0029735 A1* | 2/2008 | Gin | C09K 19/54 548/312.7 |
| 2009/0312469 A1* | 12/2009 | Koziski | C09D 175/04 524/378 |
| 2011/0033413 A1* | 2/2011 | Kwetkat | B28B 7/384 510/159 |
| 2011/0237736 A1 | 9/2011 | Roller et al. | |
| 2012/0121921 A1 | 5/2012 | Cosyns et al. | |
| 2012/0220705 A1 | 8/2012 | Hamilton et al. | |
| 2015/0051334 A1 | 2/2015 | Wu et al. | |
| 2016/0355698 A1 | 12/2016 | Harris et al. | |
| 2018/0355558 A1 | 12/2018 | Cimpeanu et al. | |
| 2019/0100613 A1 | 4/2019 | Balk et al. | |

FOREIGN PATENT DOCUMENTS

| | | |
|---|---|---|
| CN | 102321326 A | 1/2012 |
| CN | 104011087 A | 8/2014 |
| CN | 104861903 A | 8/2015 |
| CN | 106029720 A | 10/2016 |
| CN | 107163198 A | 9/2017 |
| CN | 108602921 A | 9/2018 |
| JP | 2000-219844 A | 8/2000 |
| WO | 2013/087461 A1 | 6/2013 |
| WO | 2017/093368 A1 | 6/2017 |

OTHER PUBLICATIONS

International Preliminary Report on Patentability received for PCT Patent Application No. PCT/US2020/051122, mailed on Mar. 31, 2022, 6 pages.
International Search Report and Written Opinion received for PCT Patent Application No. PCT/US2020/051122, mailed on Dec. 10, 2020, 7 pages.
Li Hongqiang, "Adhesion Theory, Technology and Application", South China University of Technology Press, Jan. 2014, pp. 179-185.

* cited by examiner

*Primary Examiner* — Stefanie J Cohen
(74) *Attorney, Agent, or Firm* — Faegre Drinker Biddle & Reath LLP

(57) ABSTRACT

Disclosed herein are coating compositions with enhanced adhesion to a variety of different substrates. In some embodiments, the coating can comprise at least one copolymer derived from a monomer mixture that includes tert-butyl acrylate.

18 Claims, No Drawings

COATINGS WITH IMPROVED ADHESION

CROSS-REFERENCE TO RELATED APPLICATIONS

This application is a national stage application (under 35 U.S.C. § 371) of PCT/US2020/051122, filed Sep. 16, 2020, which claims benefit of U.S. Application No. 62/903,342, filed Sep. 20, 2019, both of which are incorporated herein by reference in their entirety.

FIELD OF THE INVENTION

The invention is directed to architectural waterborne coatings with enhanced adhesion to a variety of different substrates, including chalked coatings, uncoated wood, alkyd coatings, aluminum, galvanized steel, and smooth steel.

BACKGROUND

Water-based emulsions containing polymer particles and pigments are frequently used as coating compositions. After the coating is applied, the water and any other solvent evaporate, drawing the polymer particles together into a network structure. The particles then coalesce to form films or coatings. The adhesion of the coatings to the substrate is related both to the degree of particle coalescence, as well as interaction between the coating and the substrate surface. A coating composition that exhibits good adhesion to one type of surface, e.g., wood, will not necessarily exhibit good adhesion to other types of surfaces, such as metallic or polymeric surfaces.

Titanium dioxide is frequently used as a pigment in water-borne coating compositions, such as latex paints. Titanium dioxide provides whiteness and hiding power to the coating. Achieving the desired levels of hiding and whiteness typically requires higher levels of titanium dioxide. At higher levels, a statistical distribution of titanium dioxide particles will result in titanium dioxide particles (at least some) being in closer proximity to one another resulting in less than optimal distance between the particles for efficient light scattering. Thus, overcrowding of titanium dioxide particles at higher titanium dioxide level will lower the efficiency of the particles to provide whiteness or hiding power. The whiteness of a particular coating can be characterized by the tint strength of the coating. Among other factors, tint strength depends on the concentration of the white pigment and how homogenously and optimally it is distributed throughout the coating. While tint strength can be increased by simply adding additional white pigment to the coating composition, this is not practical from an economic point of view. There remains a need for coating compositions with universally good adhesion to a variety of substrates. There also remains a need for coating compositions that provide high levels of whiteness at lower than normal concentrations of titanium dioxide pigment.

SUMMARY

Disclosed herein are coating compositions that include at least one copolymer derived from a monomer mixture that includes tert-butyl acrylate. The coating compositions exhibit improved adhesion and tint strength relative to other-wise matching compositions not including a copolymer derived from tert-butyl acrylate. Further, combinations of tert-butyl acrylate and a free-radical chain transfer agent as found in the coating compositions described herein synergistically improve adhesion to multiple substrates.

The details of one or more embodiments are set forth in the descriptions below. Other features, objects, and advantages will be apparent from the description and from the claims.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The coating compositions disclosed herein exhibit improved adhesion to a wide variety of substrates, including chalked coatings, uncoated wood, aluminum, smooth steel, galvanized steel, and alkyd paints. Adhesion testing was carried out according to ASTM method D-3359-97.

The coating compositions disclosed herein include a plurality of particles. The particles can have a particle size, as determined by light scattering and reported as volume average particle size, no greater than 5,000 nm, no greater than 4,000 nm, no greater than 3,000 nm, no greater than 2,000 nm, no greater than 1,000 nm, no greater than 750 nm, no greater than 500 nm, no greater than 400 nm, no greater than 300 nm, no greater than 200 nm, or no greater than 100 nm. In some embodiments, the particles have a particle size from 10-5,000 nm, from 10-4,000 nm, from 10-3,000 nm, from 10-2,000 nm, from 10-1,000 nm, from 10-750 nm, from 10-500 nm, from 10-400 nm, from 10-300 nm, from 10-200 nm, from 10-100 nm, from 10-50 nm, from 50-5,000 nm, from 50-4,000 nm, from 50-3,000 nm, from 50-2,000 nm, from 50-1,000 nm, from 50-750 nm, from 50-500 nm, from 50-400 nm, from 50-300 nm, from 50-200 nm, from 50-100 nm, from 100-1,000 nm, from 100-750 nm, from 100-500 nm, from 100-400 nm, from 100-300 nm, or from 100-200 nm.

The particles can be prepared by polymerizing a monomer mixture, for instance by emulsion polymerization, optionally in the presence of a seed. In some instances, the copolymer can be the product of a single stage polymerization; such particles can be designated single-stage particles. In other embodiments, the particles can include at least two different copolymers (a multi-stage copolymer), e.g., a first copolymer, a second copolymer, a third copolymer, etc. As used herein, reference to "first copolymer" does not necessarily require the presence of any further copolymers. In some embodiments, the first copolymer, second copolymer, etc. can be prepared in separate reaction vessels, and then combined. In preferred embodiments, the second copolymer, third copolymer, etc. is prepared by polymerizing a monomer mixture in the presence of the first copolymer.

The copolymer particles in the coating compositions disclosed herein can be characterized by glass-transition temperature ($T_g$) as determined by ASTM D3418-15. In some embodiments the first copolymer can have a $T_g$ from −10° C. to 50° C., −10° C. to 35° C., from 0° C. to 35° C., from 5° C. to 30° C., from 5° C. to 25° C., from 10° C. to 25° C., from 12° C. to 20° C., or from 5° C. to 15° C. When present, the second copolymer can have a $T_g$, as determined by ASTM D 3418-15, that is greater than the $T_g$ of the first copolymer. For instance, the second copolymer can have a $T_g$ that is at least 10° C., at least 20° C., at least 30° C., at least 40° C., at least 50° C., at least 60° C., at least 70° C., at least 80° C., at least 100° C., or at least 110° C. greater than the $T_g$ of the first copolymer. In some embodiments, the second copolymer can have a $T_g$, as determined by ASTM D 3418-15, that is between 10° C. to 110° C., between 10° C. to 100° C., between 10° C. to 90° C., between 10° C. to 80° C., between 10° C. to 70° C., between 10° C. to 60° C., between 10° C. to 50° C., between 10° C. to 40° C., between 10° C. to 30° C., between 10° C. to 20° C., between 20° C. to 110° C., between 20° C. to 70° C., or between 30° C. to 50° C. greater than the $T_g$ of the first copolymer. In some embodiments, the $T_g$, as determined by ASTM D 3418-15, of the first copolymer, is less than 300° C., less than 250° C., less than 200° C., less than 175° C., less than 150° C., less than 125° C., less than 100° C., less than 90° C., less than 80° C., less than 70° C., or less than 60° C. compared to the $T_g$ of the second copolymer.

In some embodiments the first copolymer can have a number average molecular weight, as determined by gel permeation chromatography, of at least 8,000 Da, at least 10,000 Da, at least 15,000 Da, at least 25,000 Da, at least 50,000 Da, at least 100,000 Da, or at least 200,000 Da. In some instances, the first copolymer can have a number average molecular weight between 8,000-500,000 Da, 10,000-500,000 Da, between 25,000-500,000 Da, between 50,000-500,000 Da, between 100,000-500,000 Da, between 250,000-500,000 Da, between 8,000-250,000 Da, 10,000-250,000 Da, between 25,000-250,000 Da, between 50,000-250,000 Da, between 100,000-250,000 Da, between 8,000-100,000 Da, between 10,000-100,000 Da, between 25,000-100,000 Da, between 50,000-100,000 Da, between 8,000 to 500,000 Da, between 8,000 to 2,000,000 Da, or between 8,000 to 1,000,000 Da.

The first copolymer can be a product of a polymerization reaction of a first mixture of monomers, wherein the first monomer mixture includes tert-butyl acrylate monomer or a combination of tert-butyl (meth)acrylate monomers. The tert-butyl (meth)acrylate monomer can be present in the first monomer mixture in an amount from 1-65%, from 2-65%, from 5-65%, from 5-40%, from 10-40%, from 5-35%, from 10-35%, from 5-30%, from 10-30%, from 5-25%, from 10-25%, from 15-50%, from 15-40%, from 15-35%, from 15-30%, or from 20-30% by weight, based on the total weight of monomers in the first monomer mixture. In preferred embodiments, the tert-butyl (meth)acrylate monomer is tert-butyl acrylate.

The first monomer mixture can include an n-butyl (meth)acrylate monomer. The n-butyl (methyl)acrylate monomer can be present in the first monomer mixture in an amount from 1-55%, from 5-55%, from 10-55%, from 20-55%, from 30-55%, from 40-55%, from 50-55%, from 5 to 50%, from 10-50%, from 20-50%, from 30-50%, from 40-50%, from 40-55%, or from 20-40%, based on the total weight of monomers in the first monomer mixture. In preferred embodiments, the n-butyl (methyl)acrylate monomer is n-butyl acrylate.

The first monomer mixture can include at least one ethylenically unsaturated acid. The ethylenically unsaturated acid can be present in an amount from 0.1-5%, from 0.2-5%, from 0.5-5%, from 0.5-4%, from 0.5-3%, from 0.5-2%, from 0.5 to 1% or from 1-2% by weight, based on the total monomer weight in the first monomer mixture. As used herein, an ethylenically unsaturated acid includes at least one polymerizable double or triple bond, and at least one acidic functional group, including carboxylic acids, phosphorous acids, and sulfur acids. Ammonium, alkali metal ion, alkaline earth metal ion and other metal ion salts of these acids can also be used. The ethylenically unsaturated acid can be a monocarboxylic acid, a dicarboxylic acid, an ester of phosphorous acid, or a sulfur acid. In some instances, the ethylenically unsaturated acid can have from 3-15 acid carbon atoms.

Suitable ethylenically unsaturated carboxylic acids and derivatives thereof are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, carbon atoms, e.g., monomethyl maleate, and their metal ion and ammonium salts.

Suitable sulfur acid monomers are vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and alkali metal ion or alkaline earth metal salts thereof, such as sodium styrene-3-sulfonate and sodium styrene-4-sulfonate.

Examples of phosphorus-containing monomers are vinylphosphonic acid and allylphosphonic acid, for example. Also suitable are the monoesters and diesters of phosphonic acid and phosphoric acid with hydroxyalkyl (meth)acrylates, especially the monoesters. Additionally suitable monomers are diesters of phosphonic acid and phosphoric acid that have been esterified once with hydroxyalkyl(meth)acrylate and also once with a different alcohol, such as an alkanol, for example. Suitable hydroxyalkyl (meth)acrylates for these esters are those specified below as separate monomers, more particularly 2-hydroxyethyl (meth)acrylate, 3-hydroxypropyl(meth)acrylate, 4-hydroxybutyl(meth)acrylate, etc. Corresponding dihydrogen phosphate ester monomers comprise phosphoalkyl(meth)acrylates, such as 2-phosphoethyl(meth)acrylate, 2-phosphopropyl(meth)acrylate, 3-phosphopropyl(meth)acrylate, phosphobutyl(meth)acrylate, and 3-phospho-2-hydroxypropyl(meth)acrylate. Also suitable are the esters of phosphonic acid and phosphoric acid with alkoxylated hydroxyalkyl(meth)acrylates, examples being the ethylene oxide or propylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl(meth)acrylates, phosphodialkyl crotonates and allyl phosphates. Further phosphate containing unsaturated monomers are ethyl (meth)acrylate phosphate (Sipomer® PAM 4000), phosphate esters of polypropylene glycol mono (meth)acrylate (Sipomer® PAM 200), phosphate esters of polyethylene glycol mono(meth)acrylate (Sipomer® PAM 100). In some instances, the first monomer mixture can include a mixture of ethylenically unsaturated acids, for instance (meth)acrylic acid and itaconic acid, or (meth)acrylic acid and phosphorous containing monomers described above, especially methacrylic acid and itaconic acid. Alkali or alkaline earth metal ion or ammonia neutralized salts of the above acids and combinations thereof can also be used.

The first monomer mixture can include at least one monomer of Formula (1):

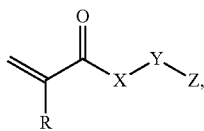

[Formula (1)]

wherein R is selected from hydrogen or methyl, X is selected from O or NH, Y is a $C_{1-6}$ alkylene group, and Z is OH or $OC(O)CH_2C(O)CH_3$. In some preferred embodiments, X can be O. In further embodiments, X can be 0 and R can be methyl. In further embodiments, X can be O, R can be methyl, and Y can be ethylene. In yet further embodiments, X can be O, R can be methyl, Y can be ethylene, and Z can be $OC(O)CH_2C(O)CH_3$. The first monomer mixture can include the monomer of Formula (1) in an amount from 0.1-15%, from 0.5-15%, from 1-15%, from 2-15%, from 2-10%, from 4-10%, or from 4-8% by weight, based on the total monomer weight in the first monomer mixture.

The first monomer mixture can include one or more additional monomers in an amount from 5-90% by weight of the total weight of the monomers in the first monomer mixture, for example which may be selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether(meth)acrylates, monomers containing urea groups, and/or mixtures thereof.

Suitable esters of α,β-ethylenically unsaturated monocarboxylic and dicarboxylic acids with $C_1$-$C_{20}$ alkanols are methyl(meth)acrylate, methyl ethacrylate, ethyl(meth)acrylate, ethyl ethacrylate, n-propyl(meth)acrylate, isopropyl (meth)acrylate, sec-butyl(meth)acrylate, tert-butyl ethacrylate, n-hexyl(meth)acrylate, n-heptyl(meth)acrylate, n-octyl (meth)acrylate, 1,1,3,3-tetramethylbutyl(meth)acrylate, ethylhexyl(meth)acrylate, propylheptyl(meth)acrylate, n-nonyl(meth)acrylate, n-decyl(meth)acrylate, n-undecyl (meth)acrylate, tridecyl(meth)acrylate, myristyl(meth)acrylate, pentadecyl(meth)acrylate, palmityl(meth)acrylate, heptadecyl(meth)acrylate, nonadecyl(meth)acrylate, arachinyl (meth)acrylate, behenyl(meth)acrylate, lignoceryl(meth)acrylate, cerotinyl(meth)acrylate, melissinyl(meth)acrylate, stearyl(meth)acrylate, lauryl(meth)acrylate, cyclohexyl (meth)acrylate, isobornyl (meth)acrylate and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, Versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable esters of α,β-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N-alkyl and N,N-dialkyl derivatives are acrylamide, methacrylamide, N-methyl (meth)acrylamide, N-ethyl(meth)acrylamide, N-propyl (meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth) acrylamide, N-heptadecyl(meth)acrylamide, N-nonadecyl (meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-stearyl(meth)acrylamide, N-lauryl(meth)acrylamide, N,N-dimethyl(meth)acrylamide, N,N-diethyl(meth) acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, and N-vinylbutyramide.

Suitable esters of $\alpha,\beta$-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate, and N,N-dimethylaminocyclohexyl (meth)acrylate.

Suitable amides of $\alpha,\beta$-ethylenically unsaturated monocarboxylic and dicarboxylic acids with diamines which contain at least one primary or secondary amino group are N-[2-(dimethylamino)ethyl]acrylamide, N-[2-(dimethylamino)ethyl]methacrylamide, N-[3-(dimethylamino)propyl] acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl] acrylamide, N-[4-(dimethylamino)cyclohexyl]acrylamide, N-[4-(dimethylamino)cyclohexyl]methacrylamide, etc.

Suitable additional monomers are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable additional monomers are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are for example ethylene, propylene, isobutylene, isoprene, butadiene, etc.

Examples of suitable additional monomers containing urea groups are N-vinylurea or N-allylurea or derivatives of imidazolidin-2-one. They include N-vinyl- and N-allylimidazolidin-2-one, N-vinyloxyethylimidazolidin-2-one, N-(2-(meth)acrylamidoethyl)imidazolidin-2-one.

Preferred monomers containing urea groups are N-(2-acryloxyethyl)imidazolidin-2-one and N-(2-methacryloxyethyl)imidazolidin-2-one. Particular preference is given to N-(2-methacryloxyethyl)imidazolidin-2-one (2-ureido methacrylate, UMA).

The additional monomers may also include crosslinking monomers, examples being monomers which carry keto groups or aldehyde groups, such as (meth)acrolein, diacetoneacrylamide (DAAM), acetoacetoxyethyl methacrylate (AAEM), which may be combined with adipic dihydrazide (ADDH) or polyamines, and also monomers which carry epoxide groups, such as glycidyl methacrylate (GMA), or monomers which carry alkoxy silane groups, such as vinyltrirthoxy silane, vinyl trmethoxy silane, methacryloxy propyl triethoxy silane, and methacryloxy propyl triethoxy silane or multiolefinically unsaturated compounds such as allyl(meth)acrylate (AMA), butanediol diacrylate, hexanediol diacrylate, and trimethylolpropane tri(meth)acrylate, for instance.

The additional monomers can be present in the first monomer mixture in an amount from 5-90%, from 10-90%, from 20-90%, from 30-90%, from 40-90%, from 50-90%, from 60-90%, from 70-90%, from 80-90%, from 5-80%, from 10-80%, from 20-80%, from 30-80%, from 40-80%, from 50-80%, from 60-80%, from 70-80%, from 5-70%, from 10-70%, from 20-70%, from 30-70%, from 40-70%, from 50-70%, from 60-70%, from 5-60%, from 10-60%, from 20-60%, from 30-60%, from 40-60%, from 50-60%, from 5-50%, from 10-50%, from 20-50%, from 30-50%, from 40-50%, from 5-40%, from 10-40%, from 20-40%, from 30-40%, from 5-30%, from 10-30%, from 20-30%, from 5-20%, or from 10-20% based on the total monomer weight in the first monomer mixture.

The first monomer mixture can include one or more free radical chain transfer agents. Suitable free radical chain transfer agents include tert-butyl mercaptan, thioglycolic acid, mercaptoethanol, mercaptopropyltrimethoxysilane, tert-dodecyl mercaptan, 1,8-dimercapto-3,6-dioxaoctane, n-dodecyl mercaptan, n-octyl mercaptan, terpinolene, 2-ethylhexyl thioglycolate, isooctyl 3-mercaptopropionate, $\alpha$-methyl styrene dimer, cobalt complexes, and combinations thereof. Other Suitable compounds in this context include substantially aliphatic and/or aralaphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in the Polymer Handbook, 3rd edition, 1989, J. Brandrup and E. H. Immergut, John Wiley & Sons, Section II, pages 133-41, but also aliphatic and/or aromatic aldehydes, such as acetaldehyde, propionaldehyde and/or benzaldehyde, unsaturated fatty acids, such as oleic acid, dienes containing nonconjugated double bonds, such as divinylmethane or vinylcyclohexane, or hydrocarbons having readily abstractable hydrogen atoms, such as toluene. It is, however, also possible to use mixtures of mutually compatible aforementioned free radical chain transfer compounds. The free radical chain transfer agent can be present in an amount of at least 0.25% by weight, at least 0.50% by weight, at least 0.75% by weight, at least 1% by weight, at least 1.25% by weight, at least 1.50% by weight, at least 1.75% by weight, or at least 2.0% by weight based on the total monomer weight in the first monomer mixture. In other embodiments, the free radical chain transfer agent can be present in an amount of no more than 0.6%, no more than 0.5%, or no more than 0.4% by weight, based on the total monomer weight in the first monomer mixture. In some embodiments, the free radical chain transfer agent can be present in an amount from 0.25-2.0% by weight, from 0.50-2.0% by weight, from 0.75-2.0% by weight, from 1.0-2.0% by weight, from 1.25-2.0% by weight, from 0.25-1.5% by weight, from 0.50-1.5% by weight, from 0.75-1.5% by weight, or from 1.0-1.5% by weight.

The first monomer mixture can include one or more polymerizable surfactants. The polymerizable surfactants included in the copolymers can comprise an olefinically unsaturated group that can participate in a free radical polymerization. Suitable polymerizable surfactants include hemi-esters of maleic anhydride of the formula $M^+$-OOC—CH=CHCOOR wherein R is $C_{6-22}$ alkyl and $M^+$ is $Na^+$, $K^+$, $Li^+$, $NH_4^+$, or a protonated or quaternary amine.

In some embodiments, the polymerizable surfactant can be selected from an acrylic acid-modified polyoxyethylene alkyl ether, an acrylic acid-modified polyoxyethylene alkyl phenyl ether, an allylic acid-modified polyoxyethylene alkyl ether, an allylic acid-modified polyoxyethylene alkyl phenyl ether, an allylic acid-modified polyoxyethylene polystyrylphenyl ether, an acrylic acid-modified polyoxyethylene polystyrylphenyl ether, polyoxyethylene-polyoxypropylene glycol monoacrylate, and mixtures thereof.

In certain embodiments, the polymerizable surfactants can have the formula 1:

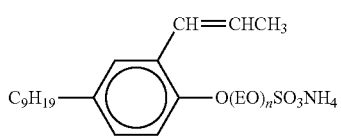

(1)

wherein n stands for a number of from 0 to 1,000. Exemplary polymerizable surfactants can include the HITENOL® BC series (Dai-Ichi Kogyo Seiyaku Co., Ltd.), such as DC-10, BC-1025, BC-20, BD-2020, and BC-30.

In certain embodiments, polymerizable surfactants suitable for use in the copolymer can have the formula 2:

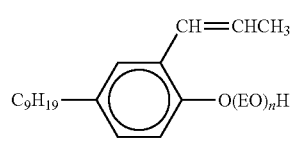

(2)

wherein n stands for a number of from 0 to 1,000. Exemplary polymerizable surfactants can include the NOIGEN® RN series (Dai-Ichi Kogyo Seiyaku Co., Ltd.), such as RN-10, RN-20, RN-30, RN-40, and RN-5065.

In certain embodiments, polymerizable surfactants suitable for use in the copolymer can have the formula 3:

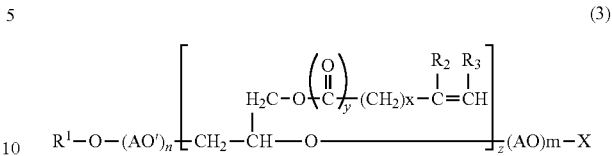

(3)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000. Suitable polymerizable surfactants are described in U.S. Pat. No. 6,841,655, which is hereby incorporated by reference in its entirety.

In certain embodiments, the polymerizable surfactants can be provided according to Formula 3a:

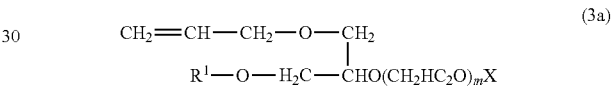

(3a)

wherein $R^1$ is $C_9$-$C_{15}$ alkyl or $C_7$-$C_{11}$ alkyl-phenyl, X is H, $SO_3NH_4$ and/or $SO_3Na$, and m is 3 to 50. In some embodiments, $R^1$ is $C_{10}$-$C_{14}$ alkyl, X is H and/or $SO_3NH_4$, and m is 5 to 40. In some embodiments, m is 5 to 25, 5 to 20, or 5 to 15 (e.g., m=10). Exemplary polymerizable surfactants wherein $R^1$ is $C_{10}$-$C_{14}$ alkyl can include ADEKA REASOAP series ER and SR surfactants (Asahi Denka Co., Ltd.), such as ER-10, ER-20, ER-30, ER-40, SR-10, SR-20, and SR-1025. For example, ADEKA REASOAP SR-10, which includes ammonium salts of poly(oxy-1,2-ethanediyl), alpha-sulfo-omega-[1-(hydroxymethyl)-2-(2-propenyloxy) ethoxy]-, C11-rich, C10-14-branched alkyl ethers, can be used. Exemplary polymerizable surfactants in which $R^1$ is $C_7$-$C_{11}$ alkyl-phenyl can include ADEKA REASOAP series NE and SE surfactants, such as NE-10, NE-20, NE-30, NE-40, NE-50, SE-10N, SE-20N, and SE-1025N.

Other representative polymerizable surfactants can include MAXEMUL™ 6112, MAXEMUL™ 5011, MAXEMUL™ 5010 (all available from Croda Industrial Specialties) and allylsulfosuccinate derivatives (such as TREM LT-40™ (available from Henkel)).

The polymerizable surfactant can be present in the first monomer mixture in an amount from 0.1-5%, from 0.2-5%, from 0.5-5%, from 1-5%, from 2-5%, from 3-5%, from 4-5%, from 0.1-4%, from 0.2-4%, from 0.5-4%, from 1-4%, from 2-4%, from 3-4%, from 0.1-3%, from 0.2-3%, from 0.5-3%, from 1-3%, from 2-3%, from 0.1-2%, from 0.2-2%, from 0.5-2%, from 1-2%, from 0.1-1%, from 0.2-1%, from 0.5-1%, from 2-5%, from 3-5%, from 4-5%, from 2-4%, from 3-4%, from 2-3%, or from 1-2% by weight on a dry surfactant weight basis, based on the total monomer weight in the first monomer mixture. In some embodiments, the first monomer mixture does not include a polymerizable surfactant.

In some embodiments, the coating composition includes multiple copolymers, for instance two copolymers. The second copolymer can be present in an amount that is from 1-50%, from 2-40%, from 2-30%, from 2-20%, from 2-10%, from 5-30%, from 5-20%, from 5-15%, or from 5-10% based on the total weight of the first copolymer and the second copolymer.

The second copolymer can be a product of a polymerization reaction of a second mixture of monomers. The second copolymer can be a product of an emulsion polymerization of a second monomer mixture, for instance a seeded emulsion polymerization of a second monomer mixture. The particles can be the product of a two-stage seeded emulsion polymerization, meaning that the second monomer mixture was polymerized in the presence of the first copolymer which was previously synthesized by seeded emulsion polymerization. In certain embodiments, the second monomer mixture does not include a tert-butyl acrylate monomer. In other embodiments, the second monomer mixture includes a tert-butyl (meth)acrylate monomer in an amount from 50-100%, from 50-90%, from 50-80%, from 50-70%, from 50-60%, 1-50%, from 2-50%, from 5-50%, from 5-40%, from 10-40%, from 5-35%, from 10-35%, from 5-30%, from 10-30%, from 5-25%, from 10-25%, from 15-50%, from 15-40%, from 15-35%, from 15-30%, or from 20-30% by weight, based on the total weight of monomers in the second monomer mixture. In preferred embodiments, the tert-butyl (meth)acrylate monomer is tert-butyl acrylate.

The second monomer mixture can include an n-butyl (meth)acrylate monomer. The n-butyl (meth)acrylate monomer can be present in the second monomer mixture in an amount from 1-90%, from 5-90%, from 10-90%, from 20-90%, from 30-90%, from 40-90%, from 50-90%, from 60-90%, from 70-90%, from 80-90%, from 10-75%, from 20-75%, from 30-75%, from 40-75%, from 50-75%, from 10-50%, from 20-50%, from 30-50%, from 40-50%, from 40-60%, or from 20-40%, based on the total weight of monomers in the second monomer mixture. In preferred embodiments, the n-butyl (meth)acrylate monomer is n-butyl acrylate.

The second monomer mixture can include at least one ethylenically unsaturated acid, as defined above. The ethylenically unsaturated acid can be present in an amount from 0.1-5%, from 0.2-5%, from 0.5-5%, from 0.5-4%, from 0.5-3%, from 0.5-2%, from 0.5 to 1.0% or from 1-2% by weight, based on the total monomer weight in the second monomer mixture. Ammonium, alkali metal ion, alkaline earth metal ion and other metal ion salts of these acids can also be used.

Suitable ethylenically unsaturated carboxylic acids, and their derivatives are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, carbon atoms, e.g., monomethyl maleate, and their metal and ammonium salts.

Suitable sulfur acid monomers are vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and the alkali metal or alkaline earth metal salts thereof, such as sodium styrene-3-sulfonate and sodium styrene-4-sulfonate.

Examples of phosphorus-containing monomers are vinylphosphonic acid and allylphosphonic acid, for example. Also suitable are the monoesters and diesters of phosphonic acid and phosphoric acid with hydroxyalkyl (meth)acrylates, especially the monoesters. Additionally suitable monomers are diesters of phosphonic acid and phosphoric acid that have been esterified once with hydroxyalkyl(meth)acrylate and also once with a different alcohol, such as an alkanol, for example. Suitable hydroxyalkyl (meth)acrylates for these esters are those specified below as separate monomers, more particularly 2-hydroxyethyl (meth)acrylate, 3-hydroxypropyl(meth)acrylate, 4-hydroxybutyl(meth)acrylate, etc. Corresponding dihydrogen phosphate ester monomers comprise phosphoalkyl(meth) acrylates, such as 2-phosphoethyl(meth)acrylate, 2-phosphopropyl(meth)acrylate, 3-phosphopropyl(meth) acrylate, phosphobutyl(meth)acrylate, and 3-phospho-2-hydroxypropyl(meth)acrylate. Also suitable are the esters of phosphonic acid and phosphoric acid with alkoxylated hydroxyalkyl(meth)acrylates, examples being the ethylene oxide or propylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl(meth)acrylates, phosphodialkyl crotonates and allyl phosphates. Further phosphate containing unsaturated monomers are ethyl (meth)acrylate phosphate (Sipomer® PAM 4000), phosphate esters of polypropylene glycol mono (meth)acrylate (Sipomer® PAM 200), phosphate esters of polyethylene glycol mono(meth)acrylate (Sipomer® PAM 100), In some instances, the first monomer mixture can include a mixture of ethylenically unsaturated acids, for instance (meth)acrylic acid and itaconic acid, or (meth) acrylic acid and phosphorous containing monomers described above, especially methacrylic acid and itaconic acid. Alkali or alkaline earth metal ion or ammonia neutralized salts of the above acids and combinations thereof can also be used. In some instances, the second monomer mixture can include a mixture of ethylenically unsaturated acids, for instance (meth)acrylic acid and itaconic acid, or (meth)acrylic acid and phosphorous containing monomers described above, especially methacrylic acid and itaconic acid.

The second monomer mixture can include at least one monomer of Formula (2):

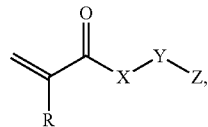

[Formula (2)]

wherein R is selected from hydrogen or methyl, X is selected from O or NH, Y is a $C_{1-6}$ alkylene group, and Z is OH or $OC(O)CH_2C(O)CH_3$. In some preferred embodiments, X can be O. In further embodiments, X can be O and R can be methyl. In further embodiments, X can be O, R can be methyl, and Y can be ethylene. In yet further embodiments, X can be O, R can be methyl, Y can be ethylene, and Z can be $OC(O)CH_2C(O)CH_3$. The second monomer mixture can include the monomer of Formula (2) in an amount from 0.1-15%, from 0.5-15%, from 1-15%, from 2-15%, from 2-10%, from 4-10%, or from 4-8% by weight, based on the total monomer weight in the second monomer mixture.

The second monomer mixture can include one or more additional monomers, for example which may be selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether(meth)acrylates, monomers containing urea groups, and/or mixtures thereof.

Suitable esters of α,β-ethylenically unsaturated monocarboxylic and dicarboxylic acids with $C_1$-$C_{20}$ alkanols are methyl(meth)acrylate, methyl ethacrylate, ethyl(meth)acrylate, ethyl ethacrylate, n-propyl(meth)acrylate, isopropyl (meth)acrylate, n-butyl(meth)acrylate, sec-butyl(meth)acrylate, tert-butyl(meth)acrylate, tert-butyl ethacrylate, n-hexyl (meth)acrylate, n-heptyl(meth)acrylate, n-octyl(meth) acrylate, 1,1,3,3-tetramethylbutyl(meth)acrylate, ethylhexyl (meth)acrylate, propylheptyl(meth)acrylate, n-nonyl(meth) acrylate, n-decyl(meth)acrylate, n-undecyl(meth)acrylate, tridecyl(meth)acrylate, myristyl(meth)acrylate, pentadecyl (meth)acrylate, palmityl(meth)acrylate, heptadecyl(meth) acrylate, nonadecyl(meth)acrylate, arachinyl(meth)acrylate, behenyl(meth)acrylate, lignoceryl(meth)acrylate, cerotinyl (meth)acrylate, melissinyl(meth)acrylate, stearyl(meth) acrylate, lauryl(meth)acrylate, cyclohexyl (meth)acrylate, isobornyl (meth)acrylate and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, Versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable esters of α,β-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N-alkyl and N,N-dialkyl derivatives are acrylamide, methacrylamide, N-methyl (meth)acrylamide, N-ethyl(meth)acrylamide, N-propyl (meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth) acrylamide, N-heptadecyl(meth)acrylamide, N-nonadecyl (meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-stearyl(meth)acrylamide, N-lauryl(meth)acrylamide, N,N-dimethyl(meth)acrylamide, N,N-diethyl(meth) acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, and N-vinylbutyramide.

Suitable esters of α,β-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate, and N,N-dimethylaminocyclohexyl (meth)acrylate.

Suitable amides of α,β-ethylenically unsaturated monocarboxylic and dicarboxylic acids with diamines which contain at least one primary or secondary amino group are N-[2-(dimethylamino)ethyl]acrylamide, N-[2-(dimethylamino)ethyl]methacrylamide, N-[3-(dimethylamino)propyl] acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl] acrylamide, N-[4-(dimethylamino)cyclohexyl]acrylamide, N-[4-(dimethylamino)cyclohexyl]methacrylamide, etc.

Suitable additional monomers are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable additional monomers are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are for example ethylene, propylene, isobutylene, isoprene, butadiene, etc.

Examples of suitable additional monomers containing urea groups are N-vinylurea or N-allylurea or derivatives of imidazolidin-2-one. They include N-vinyl- and N-allylimidazolidin-2-one, N-vinyloxyethylimidazolidin-2-one, N-(2-(meth)acrylamidoethyl)imidazolidin-2-one.

Preferred monomers containing urea groups are N-(2-acryloxyethyl)imidazolidin-2-one and N-(2-methacryloxyethyl)imidazolidin-2-one. Particular preference is given to N-(2-methacryloxyethyl)imidazolidin-2-one (2-ureido methacrylate, UMA).

The additional monomers may also include crosslinking monomers, examples being monomers which carry keto groups or aldehyde groups, such as (meth)acrolein, diacetoneacrylamide (DAAM), acetoacetoxyethyl methacrylate (AAEM), which may be combined with adipic dihydrazide (ADDH) or polyamines, and also monomers which carry epoxide groups, such as glycidyl methacrylate (GMA), or monomers which carry alkoxysilane groups, such as vinyl triethoxysilane, vinyl trimethoxysilane, methacryloxy propyl triethoxysilane, and methacryloxy propyl triethoxysilane or polyolefinically unsaturated compounds such as allyl (meth)acrylate (AMA), butanediol diacrylate, hexanediol diacrylate, and trimethylolpropane tri(meth)acrylate, for instance.

The additional monomers can be present in the second monomer mixture in an amount from 5-90%, from 10-90%, from 20-90%, from 30-90%, from 40-90%, from 50-90%, from 60-90%, from 70-90%, from 80-90%, from 5-80%, from 10-80%, from 20-80%, from 30-80%, from 40-80%, from 50-80%, from 60-80%, from 70-80%, from 5-70%, from 10-70%, from 20-70%, from 30-70%, from 40-70%, from 50-70%, from 60-70%, from 5-60%, from 10-60%, from 20-60%, from 30-60%, from 40-60%, from 50-60%, from 5-50%, from 10-50%, from 20-50%, from 30-50%, from 40-50%, from 5-40%, from 10-40%, from 20-40%, from 30-40%, from 5-30%, from 10-30%, from 20-30%, from 5-20%, or from 10-20% based on the total monomer weight in the second monomer mixture.

The second monomer mixture can include one or more free radical chain transfer agents. Suitable free radical chain transfer agents include tert-butyl mercaptan, thioglycolic acid, mercaptoethanol, mercaptopropyltrimethoxysilane, tert-dodecyl mercaptan, 1,8-dimercapto-3,6-dioxaoctane, n-dodecyl mercaptan, n-octyl mercaptan, 2-ethylhexyl thioglycolate, isoocty 3-mercaptopropionate, terpinolene, α-methyl styrene dimer, cobalt complexes, and combinations thereof. Other Suitable compounds in this context include substantially aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in the Polymer Handbook, 3rd edition, 1989, J. Brandrup and E. H. Immergut, John Wiley & Sons, Section II, pages 133-41, but also aliphatic and/or aromatic aldehydes, such as acetaldehyde, propionaldehyde and/or benzaldehyde, unsaturated fatty acids, such as oleic acid, dienes containing nonconjugated double bonds, such as divinylmethane or vinylcyclohexane, or hydrocarbons having readily abstractable hydrogen atoms, such as toluene. It is, however, also possible to use mixtures of mutually compatible aforementioned free radical chain transfer compounds. The free radical chain transfer agent can be present in an amount of at least 0.25% by weight, at least 0.50% by weight, at least 0.75% by weight, at least 1% by weight, at least 1.25% by weight, at least 1.50% by weight, at least 1.75% by weight, or at least 2% by weight based on the total monomer weight. In other embodiments, the free radical chain transfer agent can be present in an amount of no more than 0.6%, no more than 0.5%, or no more than 0.4% by weight, based on the total monomer weight. In some embodiments, the free radical chain transfer agent can be present in an amount from 0.25-2.0% by weight, from 0.50-2.0% by weight, from 0.75-2.0% by weight, from 1.0-2.0% by weight, from 1.25-2.0% by weight, from 0.25-1.5% by weight, from 0.50-1.5% by weight, from 0.75-1.5% by weight, or from 1.0-1.5% by weight.

The second monomer mixture can include one or more polymerizable surfactants. Suitable polymerizable surfactants for the second monomer mixture include the compounds described about with regard to the first monomer mixture. The polymerizable surfactant can be present in the second monomer mixture in an amount from 0.1-5%, from 0.2-5%, from 0.5-5%, from 1-5%, from 2-5%, from 3-5%, from 4-5%, from 0.1-4%, from 0.2-4%, from 0.5-4%, from 1-4%, from 2-4%, from 3-4%, from 0.1-3%, from 0.2-3%, from 0.5-3%, from 1-3%, from 2-3%, from 0.1-2%, from 0.2-2%, from 0.5-2%, from 1-2%, from 0.1-1%, from 0.2-1%, from 0.5-1%, from 2-5%, from 3-5%, from 4-5%, from 2-4%, from 3-4%, from 2-3%, or from 1-2% by weight on a dry surfactant weight basis, based on the total monomer weight in the second monomer mixture. In some embodiments, the second monomer mixture not include a polymerizable surfactant.

The coating compositions disclosed herein can also include one or more pigments. Suitable pigments include $TiO_2$, calcium carbonate, talc, kaolin, sodium potassium aluminum silicate, barium sulfate, zinc oxide, zinc phosphate, synthetic hollow sphere organic particles with air inclusion (example AQACell HIDE 6299), etc. Additional representative pigments include inorganic coloring pigments such as white pigments such as zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The following monomer mixtures may be used to prepare polymer particles:

|  | Percent Composition |
|---|---|
| First Monomer Mixture (95% to 80% of Total Mixture) | |
| Itaconic acid | 0.5% to 1.5% |
| Methacrylic acid | 0.25% to 1.5% |
| n-Butyl acrylate | 27% to 50% |

-continued

| | Percent Composition |
|---|---|
| Methyl methacrylate | 10% to 42% |
| t-Butyl acrylate | 5% to 65% |
| Acetoacetoxyethyl methacrylate | up to 7% |
| Tert-dodecyl mercaptan | 0.1% to 2.0% |
| Second Monomer Mixture (5-20% of Total Mixture) | |
| n-Butyl acrylate | 10% to 50% |
| Methyl methacrylate | 50% to 90% |
| Tert-dodecyl mercaptan | 0.0% to 2.0% |

EXAMPLES

The following examples are for the purpose of illustration of the invention only and are not intended to limit the scope of the present invention in any manner whatsoever.

Procedure 1: Synthesis of Polymer Dispersions from One Monomer Mixture

A polymerization vessel equipped with metering devices and temperature regulation was charged under a nitrogen atmosphere at 20 to 25° C. (room temperature) with initial charge. This initial charge was heated to 85° C. with stirring. When the set temperature was reached, a portion (typically 10%) of Feed 1 was added and the mixture was stirred for 5 minutes. Thereafter Feeds 1 and 2 were commenced; Feed 1 was metered in over 2.9 hours, and Feed 2 over 2.9 hours. When the feeds are complete, the monomer vessel was flushed with Feed 3 water. Ten minutes after the end of addition of the feeds, the temperature was reduced to 80° C. and Feed 4 was added over 0.25 hours. Five minutes after the end of Feed 4, Feeds 5 and 6 were metered in over 60 minutes in parallel. After 30 minutes from the end of these feeds, Feed 7 was added over 5 minutes and the batch was cooled below 40° C. The pH was adjusted to 8.5 using 19% ammonia solution. % Weight solids, pH and particle size of the polymer dispersion were measured.

Representative examples of polymer dispersions prepared using procedure 1 are provided in Tables 1 and 2.

TABLE 1

Polymer Dispersions Prepared Using Procedure 1 - Example 1, Example 2, and Example 3

| | Ingredient | Example 1 | Example 2 | Example 3 |
|---|---|---|---|---|
| Initial Charge | Water | 435.8 | 432.6 | 432.5 |
| | Styrene seed | 25.1 | 24.5 | 25.0 |
| Feed 1 | Water | 31.0 | 30.8 | 30.8 |
| | Sodium Persulfate | 2.5 | 2.5 | 2.5 |
| Feed 2 | Water | 335.4 | 332.9 | 332.9 |
| | Adeka Reasoap SR 1025 | 30.2 | 30.0 | 30.0 |
| | Itaconic acid | 10.1 | 10.0 | 10.0 |
| | Methacrylic acid | 10.1 | 10.0 | 10.0 |
| | n-Butyl acrylate | 327.1 | 324.7 | 429.6 |
| | Methyl methacrylate | 246.6 | 244.8 | 489.5 |
| | t-Butyl acrylate | 352.3 | 349.7 | 0.0 |
| | Acetoacetoxyethyl methacrylate | 60.4 | 59.9 | 59.9 |
| | t-Dodecyl mercaptan | 0.0 | 15.0 | 15.0 |
| | 19% Aqueous ammonium hydroxide | 5.3 | 5.3 | 5.3 |
| Feed 3 | Water (Flush) | 30.0 | 30.0 | 30.0 |
| Feed 4 | Water | 4.7 | 4.7 | 4.7 |
| | 19% Aqueous Ammonium hydroxide | 6.6 | 6.6 | 6.6 |
| Feed 5 | Water | 34.8 | 34.7 | 34.7 |
| | Aqueous t-butyl hydroperoxide (70%) | 1.9 | 1.9 | 1.9 |
| Feed 6 | Water | 34.5 | 34.4 | 34.4 |
| | Sodium meta-bisulfite | 2.2 | 2.2 | 2.2 |
| Feed 7 | Water | 44.3 | 44.3 | 44.3 |
| | 19% Aqueous ammonium hydroxide | 2.6 | 2.6 | 2.6 |
| % Weight Solids | | 53.8 | 52.5 | 52.3 |
| pH | | 8.5 | 8.5 | 8.5 |
| Particle Size (volume average, nm) | | 138 | 133 | 123 |
| Measured Tg ° C. | | 20.8 | 13.2 | 15.4 |

TABLE 2

Polymer Dispersions Prepared Using Procedure
1 - Example 4, Example 5, and Example 6

| | Ingredient | Example 4 | Example 5 |
|---|---|---|---|
| Initial Charge | Water | 435.8 | 433.6 |
| | Styrene seed | 25.1 | 25.0 |
| Feed 1 | Water | 31.0 | 31.0 |
| | Sodium Persulfate | 2.5 | 2.5 |
| Feed 2 | Water | 335.4 | 333.7 |
| | Adeka Reasoap SR 1025 | 30.2 | 30.0 |
| | Itaconic acid | 10.1 | 10.0 |
| | Methacrylic acid | 10.1 | 10.0 |
| | n-Butyl acrylate | 432.8 | 266.4 |
| | Methyl methacrylate | 493.2 | 104.1 |
| | t-Buty lacrylate | 0.0 | 550.8 |
| | Acetoacetoxyethyl methacrylate | 60.4 | 60.0 |
| | t-Dodecyl mercaptan | 0.0 | 10.0 |
| | 19% Aqueous ammonium hydroxide | 5.3 | 5.3 |
| Feed 3 | Water (Flush) | 30.0 | 30.0 |
| Feed 4 | Water | 4.7 | 4.7 |
| | 19% Aqueous ammonium hydroxide | 6.6 | 6.6 |
| Feed 5 | Water | 34.7 | 34.7 |
| | Aqueous t-butyl hydroperoxide (70%) | 1.9 | 1.9 |
| Feed 6 | Water | 34.4 | 34.4 |
| | Sodium meta-bisulfite | 2.2 | 2.2 |
| Feed 7 | Water | 44.3 | 44.3 |
| | 19% Aqueous ammonium hydroxide | 2.6 | 2.6 |
| % Weight Solids | | 52.1 | 51.3 |
| pH | | 8.5 | 8.5 |
| Particle Size (volume average, nm) | | 129 | 136 |
| Measured Tg ° C. | | 25.0 | 15.2 |

Representative paint formulations for the polymer dispersions of examples 1-5 are provided in Table 3:

TABLE 3

Representative Paint Formulations Prepared
from Polymer Dispersions of Examples 1-5

| | Paint Example 1 | Paint Example 2 | Paint Example 3 | Paint Example 4 | Paint Example 5 |
|---|---|---|---|---|---|
| Water | 56.90 | 56.90 | 56.90 | 56.90 | 56.90 |
| Ammonium Hydroxide (28%) | 1.10 | 1.10 | 1.10 | 1.10 | 1.10 |
| Rheovis PE 1331 | 10.00 | 10.00 | 10.00 | 10.00 | 10.00 |
| Foamstar ST 2434 | 0.50 | 0.50 | 0.50 | 0.50 | 0.50 |
| Dispex CX 4320 | 3.00 | 3.00 | 3.00 | 3.00 | 3.00 |
| Proxel BD 20 | 1.50 | 1.50 | 1.50 | 1.50 | 1.50 |
| Zoco 101 | 10.10 | 10.10 | 10.10 | 10.10 | 10.10 |
| Minex 10 | 5.00 | 5.00 | 5.00 | 5.00 | 5.00 |
| Attagel 50 | 1.55 | 1.55 | 1.55 | 1.55 | 1.55 |
| Kronos 4311 | 150.00 | 150.00 | 150.00 | 150.00 | 150.00 |
| Polymer example 1 | 211.0 | | | | |
| Polymer example 2 | | 216.0 | | | |
| Polymer example 3 | | | 216.8 | | |
| Polymer example 4 | | | | 218.0 | |
| Polymer example 5 | | | | | 221.0 |
| Polymer example 6 | | | | | |
| Hydropalat WE 3320 | 1.30 | 1.30 | 1.30 | 1.30 | 1.30 |
| Texanol | 5.00 | 5.00 | 5.00 | 5.00 | 5.00 |
| FoamStar ST 2434 | 0.80 | 0.80 | 0.80 | 0.80 | 0.80 |
| Polyphase 663 | 3.10 | 3.10 | 3.10 | 3.10 | 3.10 |
| Rheovis PE 1331 | 10.00 | 10.00 | 11.00 | 13.00 | 10.00 |
| Rheovis PU 1191 | 2.0 | 1.5 | 1.5 | 2.0 | 1.0 |
| Water | 53.8 | 48.8 | 48.1 | 46.9 | 43.9 |
| Total Weight | 526.7 | 526.2 | 527.3 | 529.8 | 525.8 |

Gloss, adhesion to various substrates, and tint strength data for paint examples 1-5 are provided in Tables 4 and 5.

TABLE 4

Gloss, Dry or Wet Adhesion to Various Substrates at 1 or 7 Days
Dry Time, and Tint Strength Data for Paint Examples 1-3

| | Paint Example 1 | Paint Example 2 | Paint Example 3 |
|---|---|---|---|
| Gloss 20° | 8.4 | 27.2 | 20.9 |
| Gloss 60° | 40.3 | 62.2 | 57.2 |
| Gloss 85° | 76.9 | 85.7 | 82.8 |
| Dry adhesion Alkyd 1 day | 0B | 4B | 4B |
| Dry adhesion Alkyd 7 days | 4B | 5B | 4B |
| Wet adhesion Alkyd 1 day | 1B | 4B | 3B |
| Wet adhesion Alkyd 7 days | 4B | 4B | 4B |
| Dry adhesion Aluminum 1 day | 4B | 4B | 4B |
| Dry adhesion Aluminum 7 days | 5B | 5B | 5B |
| Wet adhesion Aluminum 1 day | 4B | 5B | 4B |
| Wet adhesion Aluminum 7 days | 5B | 5B | 5B |
| Dry adhesion Smooth Steel 1 day | 4B | 4B | 4B |
| Dry adhesion Smooth Steel 7 days | 5B | 4B | 4B |
| Wet adhesion Smooth Steel 1 day | 4B | 3B | 4B |
| Wet adhesion Smooth Steel 7 days | 3B | 4B | 4B |
| Dry adhesion Galvanized Steel 1 Day | 4B | 4B | 3B |
| Dry adhesion Galvanized Steel 7 Days | 4B | 4B | 4B |
| Wet adhesion Galvanized Steel 1 Day | 4B | 4B | 4B |
| Wet adhesion Galvanized Steel 7 Days | 4B | 5B | 4B |
| Dry adhesion Chalked paint 1 Day | 3B | 4B | 3B |

TABLE 4-continued

Gloss, Dry or Wet Adhesion to Various Substrates at 1 or 7 Days Dry Time, and Tint Strength Data for Paint Examples 1-3

|  | Paint Example 1 | Paint Example 2 | Paint Example 3 |
|---|---|---|---|
| Dry adhesion Chalked paint 7 Days | 4B | 5B | 4B |
| Wet adhesion Chalked paint 1 Day | 0B | 2B | 1B |
| Wet adhesion Chalked paint 7 Days | 4B | 3B | 4B |
| Dry adhesion Southern Yellow Pine 1 Day | 4B | 4B | 4B |
| Dry adhesion Southern Yellow Pine 7 Days | 5B | 5B | 5B |
| Wet adhesion Southern Yellow Pine 1 Day | 1B | 0B | 0B |
| Wet adhesion Southern Yellow Pine 7 Days | 4B | 4B | 4B |
| Total Adhesion | 84 | 95 | 89 |
| Tint Strength | 103.13 | 102.19 | 99.42 |

TABLE 5

Gloss, Dry or Wet Adhesion to Various Substrates at 1 or 7 Days Dry Time, Dirt Pickup Resistance, and Tint Strength Data for Paint Examples 4 and 5

|  | Paint Example 4 | Paint Example 5 |
|---|---|---|
| Gloss 20° | 8 | 15.7 |
| Gloss 60° | 39.5 | 50.9 |
| Gloss 85° | 50.9 | 60.5 |
| Dry adhesion Alkyd 1 day | 0B | 2B |
| Dry adhesion Alkyd 7 days | 1B | 4B |
| Wet adhesion Alkyd 1 day | 0B | 3B |
| Wet adhesion Alkyd 7 days | 0B | 4B |
| Dry adhesion Aluminum 1 day | 4B | 5B |
| Dry adhesion Aluminum 7 days | 5B | 5B |
| Wet adhesion Aluminum 1 day | 5B | 5B |
| Wet adhesion Aluminum 7 days | 5B | 5B |
| Dry adhesion Smooth Steel 1 day | 1B | 4B |
| Dry adhesion Smooth Steel 7 days | 4B | 4B |
| Wet adhesion Smooth Steel 1 day | 0B | 2B |
| Wet adhesion Smooth Steel 7 days | 3B | 2B |
| Dry adhesion Galvanized Steel 1 day | 0B | 4B |
| Dry adhesion Galvanized Steel 7 Days | 3B | 5B |
| Wet adhesion Galvanized Steel 1 Day | 2B | 4B |
| Wet adhesion Galvanized Steel t 7 Days | 4B | 5B |
| Dry adhesion Chalked paint 1 Day | 2B | 3B |
| Dry adhesion Chalked paint 7 Days | 4B | 4B |
| Wet adhesion Chalked paint 1 Day | 0B | 0B |
| Wet adhesion Chalked paint 7 Days | 2B | 3B |
| Dry adhesion Southern Yellow Pine 1 Day | 4B | 4B |
| Dry adhesion Southern Yellow Pine 7 Days | 5B | 5B |
| Wet adhesion Southern Yellow Pine 1 Day | 2B | 0B |
| Wet adhesion Southern Yellow Pine 7 Days | 4B | 4B |
| Total Adhesion | 60 | 86 |
| Tint Strength | control | 107.65 |

Procedure 2: Synthesis of Polymer Dispersion From Two Monomer Mixtures

A polymerization vessel equipped with metering devices and temperature regulation was charged under a nitrogen atmosphere at 20 to 25° C. (room temperature) with initial charge. This initial charge was heated to 85° C. with stirring. When set temperature was reached, a portion (typically 10%) of Feed 1 was added and the mixture was stirred for 5 minutes. There after Feeds 1 and 2 were commenced; Feed 1 was metered in over 3.25 hours, and Feed 2 over 2.65 hours. Ten minutes after the end of Feed 2, Feed 3 was added over 0.5 hours. Then the monomer vessel was flushed with Feed 4 water. Ten minutes after the end of feeds, temperature was reduced to 80° C. and Feed 5 was added over 0.25 hours. Five minutes after the end of Feed 5, Feeds 6 and 7 were metered in over 60 minutes in parallel. After 30 minutes from the end of these feeds, Feed 8 was added, and the batch was cooled below 40° C. The pH of the polymer dispersion was adjusted to 8.5 using 19% ammonia solution. % Weight solids, pH and particle size of polymer dispersion were measured.

A representative example of polymer dispersion prepared using procedure 2 (Example 6) is provided in Table 6.

TABLE 6

Polymer Dispersion Prepared Using Procedure 2 - Example 6

|  | Ingredient | Example 6 |
|---|---|---|
| Initial Charge | Water | 435.2 |
|  | Styrene seed | 19.5 |
| Feed 1 | Water | 30.7 |
|  | Sodium Persulfate | 2.2 |
| Feed 2 | Water | 251.6 |
|  | Adeka Reasoap SR 1025 | 24.9 |
|  | Itaconic acid | 7.0 |
|  | Methacrylic acid | 7.0 |
|  | n-Butyl acrylate | 358.8 |

TABLE 6-continued

Polymer Dispersion Prepared Using Procedure 2 - Example 6

|  | Ingredient | Example 6 |
|---|---|---|
|  | Methylmethacrylate | 287 |
|  | t-Butylacrylate | 174.4 |
|  | Acetoacetylmethacrylate | 59.8 |
|  | t-Dodecyl mercaptan | 15.0 |
|  | 19% Aqueous ammonium hydroxide | 5.9 |
| Feed 3 | Water | 74.7 |
|  | Adeka Reasoap SR 1025 | 12.0 |
|  | n-Butyl acrylate | 19.9 |
|  | Methylmethacrylate | 81.7 |
|  | t-Dodecyl mercaptan | 2.2 |
| Feed 4 | Water | 29.9 |
| Feed 5 | Water | 5.3 |
|  | 19% Aqueous ammonium hydroxide | 5.8 |
| Feed 6 | Water | 34.7 |
|  | Aqueous t-butyl hydroperoxide (70%) | 1.9 |
| Feed 7 | Water | 34.4 |
|  | Sodium metabisulfite | 2.2 |
| Feed 8 | Water | 44.3 |
|  | 19% aqueous ammonium hydroxide | 2.6 |
| % Weight Solids |  | 52.5 |
| pH |  | 8.5 |
| Particle Size (volume average, nm) |  | 143 |
| Measured Tg ° C. |  | 11 |

A representative paint formulation for the polymer dispersion of Example 6 is provided in Table 7:

TABLE 7

Representative Paint Formulation Prepared from Polymer Dispersion of Example 6

|  | Paint Example 6 |
|---|---|
| Water | 56.90 |
| Ammonia Hydroxide (28%) | 1.10 |
| Rheovis PE 1331 | 10.00 |
| FoamStar ST 2434 | 0.50 |
| Dispex CX 4320 | 3.00 |
| Proxel BD 20 | 1.50 |
| Zoco 101 | 10.10 |
| Minex 10 | 5.00 |
| Attagel 50 | 1.55 |
| Kronos 4311 | 150.00 |
| Grind for 20 minutes; then let down with following |  |
| Example 7 | 217.0 |
| Hydropalat WE 3320 | 1.30 |
| Texanol | 5.00 |
| FoamStar ST 2434 | 0.80 |
| Polyphase 663 | 3.10 |
| Rheovis PE 1331 | 14.00 |
| Rheovis PU 1191 | 2.0 |
| Water | 47.8 |
| Total Weight | 530.7 |

Gloss, adhesion to various surfaces, and tint strength data for Example 6 are provided in Table 8.

TABLE 8

Gloss, Dry or Wet Adhesion to Various Substrates at 1 or 7 Days Dry Time, and Tint Strength Data for Example 6

|  | Example 6 |
|---|---|
| Gloss 20° | 30.9 |
| Gloss 60° | 66.6 |
| Gloss 85° | 87.2 |
| Dry adhesion Alkyd 1 day | 2B |
| Dry adhesion Alkyd 7 days | 5B |
| Wet adhesion Alkyd 1 day | 2B |
| Wet adhesion Alkyd 7 days | 5B |
| Dry adhesion Aluminum 1 day | 4B |
| Dry adhesion Aluminum 7 days | 5B |
| Wet adhesion Aluminum 1 day | 4B |
| Wet adhesion Aluminum 7 days | 5B |
| Dry adhesion Smooth Steel 1 day | 4B |
| Dry adhesion Smooth Steel 7 days | 5B |
| Wet adhesion Smooth Steel 1 day | 0B |
| Wet adhesion Smooth Steel 7 days | 5B |
| Dry adhesion Galvanized Steel 1 Day | 3B |
| Dry adhesion Galvanized Steel 7 Days | 5B |
| Wet adhesion Galvanized Steel 1 Day | 5B |
| Wet adhesion Galvanized Steel 7 Days | 5B |
| Dry adhesion Chalked paint 1 Day | 3B |
| Dry adhesion Chalked paint 7 Days | 4B |
| Wet adhesion Chalked paint 1 Day | 0B |
| Wet adhesion Chalked paint 7 Days | 4B |
| Dry adhesion Southern Yellow Pine 1 Day | 4B |
| Dry adhesion Southern Yellow Pine 7 Days | 5B |
| Wet adhesion Southern Yellow Pine 1 Day | 0B |
| Wet adhesion Southern Yellow Pine 7 Days | 4B |
| Total Adhesion | 88 |
| Tint Strength | 99.92 |

Experimental Procedures
Polymer Tg Measurement:

The Tg of the polymers was measured using a differential scanning colorimeter according to ASTM D3418-15. The temperature range tested was −50° C. to 125° C. with a heating rate of 20° C. per minute.

Gloss Measurement:

Paint film drawdowns were made with a BYK 7 mil Dow latex film caster on plain white sealed paper and the samples were dried for 24 hrs at 50% humidity and 76° F. Then three gloss measurements were made at the top, middle and bottom section of the panel using a BYK Gardner Trigloss meter. Average values of these three measurements were reported.

Crosshatch Adhesion Testing:

ASTM D 3559 tested method was followed. The metal panels (Q-PANELS purchased from QLab corporation (3003 H14 Aluminum, Mill finish, Stock No A-612; Hot dipped Galvanized steel G90, Stock No SP-105210; Smooth finish Steel, Sock No QD-612) were cleaned with methyl ethyl ketone and dried for 2 hours. Then paint drawdowns were made using a BYK (A1547) 250 micron drawdown bar, and samples were dried for 24 hrs or 7 days as needed for the test. Then an 11×11 grid pattern was scribed with 2 mm separation between the grids.

Adhesion was tested using the polyester/Rope-Fiber Laminate Intertape LA-26/NAT160 LA-26 as described in ASTM 3559. For wet adhesion, a paper towel was placed on the scribed grid area and soaked with water for 10 minutes. After 10 minutes, the paper towel was removed, and the grid area was blot dried with paper towel to remove water. The grid area was allowed to dry for 10 minutes and then the adhesion was tested using the tape. Panels painted with alkyd paints were prepared by drawing down the alkyd paint using BYK 7 mil Dow latex film caster on a Leneta scrub chart. The drawdowns were cured for 28 days at 50% humidity and 76° F. These cured panels were used for drawing down paints formulated with polymers as described herein. Paints were drawdown using BYK (A1547) 250 micron drawdown bar and cured for 24 hours or 7 days as needed for the test. The adhesion was tested as described above. To test adhesion to chalked paint, cedar wood with chalked paint film were used. Painted cedar wood boards were weathered to a chalk rating of 5 on an exterior natural weathering fence. Then, these boards were painted with paints as described herein using a brush at a natural coverage rate and the paints were dried at 50% humidity and 76° F. for 24 hours or 7 days as needed for the test. Then the dry and wet adhesion were tested as described above.

Tint Strength Measurement:

0.583 grams of EL phthalo blue colorant sold under the name Pure options colorant by BASF Corporation was added to 50 grams of the paint sample and mixed in a Flack Tek mixing equipment at 2300 rpm for 2 minutes. Paint drawdowns were made using Gardco 3 mil PGT bird type film applicator on an opacity chart. The paints were air dried for 15 minutes at 50% humidity and 76° F. and then dried in an oven at 50° C. for 30 minutes. Then the samples were cooled to ambient temperature. The tint strength was measured using X-Rite Spectrophotometer. Example 4 was used as control and considered to have 100% tint strength. The tint strength of the examples were compared against the tint strength of Example 4. Higher tint strength indicates better titanium dioxide distribution, and better whiteness and better hiding power.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A coating composition, comprising a plurality of polymer particles comprising a first copolymer derived from a first polymerization of a first monomer mixture in an amount from 95 to 80% by weight, based on the total weight of the first copolymer and the second copolymer and a second copolymer derived from a second polymerization of a second monomer mixture in an amount from 5-20% by weight, based on the total weight of the first copolymer and the second copolymer, the first monomer mixture comprising:

25 to 65% by weight tert-butyl acrylate, based on the total monomer weight in the first monomer mixture;

5 to 55% by weight n-butyl (meth)acrylate, based on the total monomer weight in the first monomer mixture; and at least one ethylenically unsaturated acid in an amount from 0.1-5% by weight, based on the total monomer weight in the first monomer mixture;

wherein the first monomer mixture comprises a free radical chain transfer agent selected from tert-butyl mercaptan, mercaptoethanol, mercaptopropyltrimethoxysilane, tert-dodecyl mercaptan, 1,8-dimercapto-3,6-dioxaoctane, n-dodecyl mercaptan, n-octyl mercaptan, terpinolene, 2-ethylhexyl thioglycolate, iso-octyl mercapto propionate, α-methyl styrene dimer, cobalt complexes, and combinations thereof;

wherein the first monomer mixture comprises a free radical chain transfer agent in an amount of at least 0.25% by weight based on the total monomer weight in the first monomer mixture; and wherein the second monomer mixture comprises tert-butyl acrylate, styrene, n-butyl (meth)acrylate, methyl methacrylate, or a combination thereof, wherein the second monomer mixture comprises at least one ethylenically unsaturated acid on an amount from 0.2-5% by weight, based on the total monomer weight in the second monomer mixture.

2. The composition according to claim 1, wherein the first monomer mixture comprises tert-butyl acrylate in an amount from 10 to 65% by weight, based on the total monomer weight in the first monomer mixture.

3. The composition according to claim 1, wherein the first polymerization is an emulsion polymerization.

4. The composition according to claim 1, wherein the first polymerization is a seeded emulsion polymerization.

5. The composition according to claim 1, wherein the first polymer has a $T_g$, as measured by differential scanning calorimetry (DSC) using the mid-point temperature as described in ASTM D3418-15, from −10 to 50° C.

6. The composition according to claim 1, wherein the first monomer mixture comprises 5 to 90% by weight of further polymerizable monomers, based on the total monomer weight in the first monomer mixture.

7. The composition according to claim 1, wherein the first monomer mixture comprises styrene, methyl (meth)acrylate, 2-ethylhexyl (meth)acrylate or a combination thereof.

8. The composition according to claim 1, wherein the first monomer mixture comprises styrene.

9. The composition according to claim 1, wherein the first monomer mixture comprises methyl methacrylate.

10. The composition according to claim 1, wherein the first monomer mixture comprises at least one ethylenically unsaturated acid selected from a carboxylic acid, a sulfur acid, a phosphorous acid, and combinations thereof.

11. The composition according to claim 1, wherein the first monomer mixture comprises acrylic acid, methacrylic acid, itaconic acid, maleic acid, fumaric acid, crotonic acid, vinyl acetic acid, citraconic acid, aconitic acid, 2-ethylacrylic acid, vinyl benzoic acid, vinyl sulfonic acid, allylsulfonic acid, methallylsulfonic acid, styrenesulfonic, allyloxybenzenesulfonic acid, 2-acrylamido-2-methylpropanesulfonic acid, vinylphosphonic acid, alkyl or ethyl methacrylate phosphate, phosphate esters of polypropylene glycol mono methacrylate, phosphate esters of polyethylene glycol mono methacrylate, phosphate esters of mixture of polypropylene glycol and polyethylene glycol mono methacrylate, ammonium and metal ion salts of above acids or combinations thereof.

12. The composition according to claim 1, wherein the first monomer mixture comprises a mixture of methacrylic acid and itaconic acid.

13. The composition according to claim 1, wherein the first monomer mixture comprises at least one ethylenically unsaturated acid in an amount from 0.5 to 2%, based on the total monomer weight in the first monomer mixture.

14. The composition according to claim 1, wherein the first monomer mixture comprises at least one monomer of Formula (1):

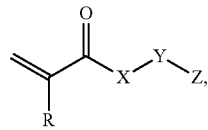

[Formula (1)]

wherein R is selected from hydrogen or methyl, X is selected from O or NH, Y is a $C_{1-6}$ alkylene group, and Z is OH or $OC(O)CH_2C(O)CH_3$.

15. The composition according to claim 1, wherein the first monomer mixture comprises a monomer of Formula (1) in an amount from 0.1 to 15%, based on the total monomer weight in the first monomer mixture.

16. The composition according to claim 1, wherein the first monomer mixture comprises a monomer of Formula (1), wherein X is O.

17. The composition according to claim 1, wherein the first monomer mixture comprises a monomer of Formula (1), wherein R is methyl.

18. The composition according to claim 1, wherein the first monomer mixture comprises a monomer of Formula (1), wherein Y is ethylene.

* * * * *